June 10, 1930. C. F. WALLACE 1,762,706
APPARATUS FOR PRODUCING A PROPORTIONATELY VARYING NEGATIVE PRESSURE
Filed Nov. 30, 1927 3 Sheets-Sheet 2
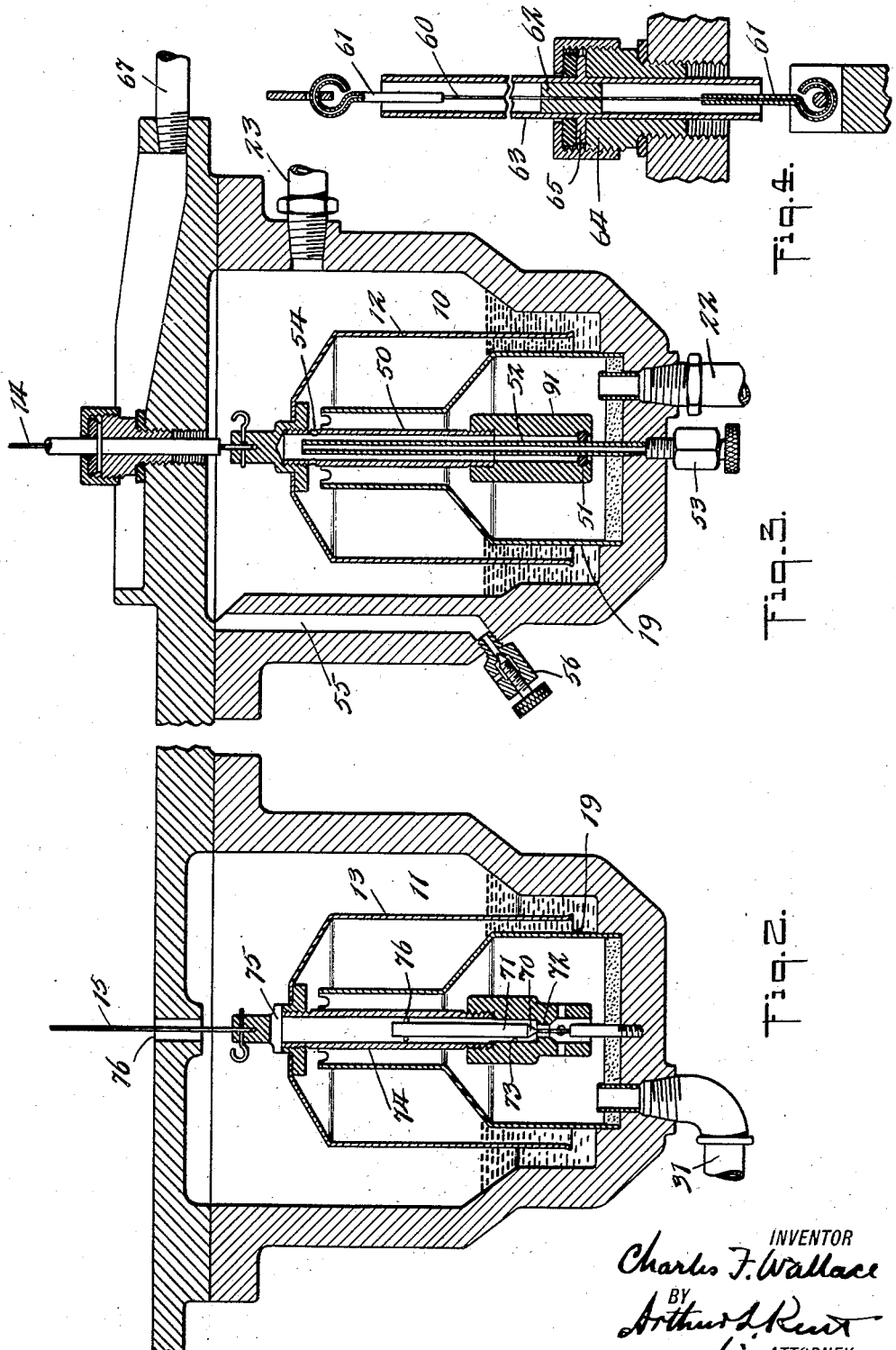
INVENTOR
Charles F. Wallace
BY
Arthur L. Rent
his ATTORNEY Patented June 10, 1930

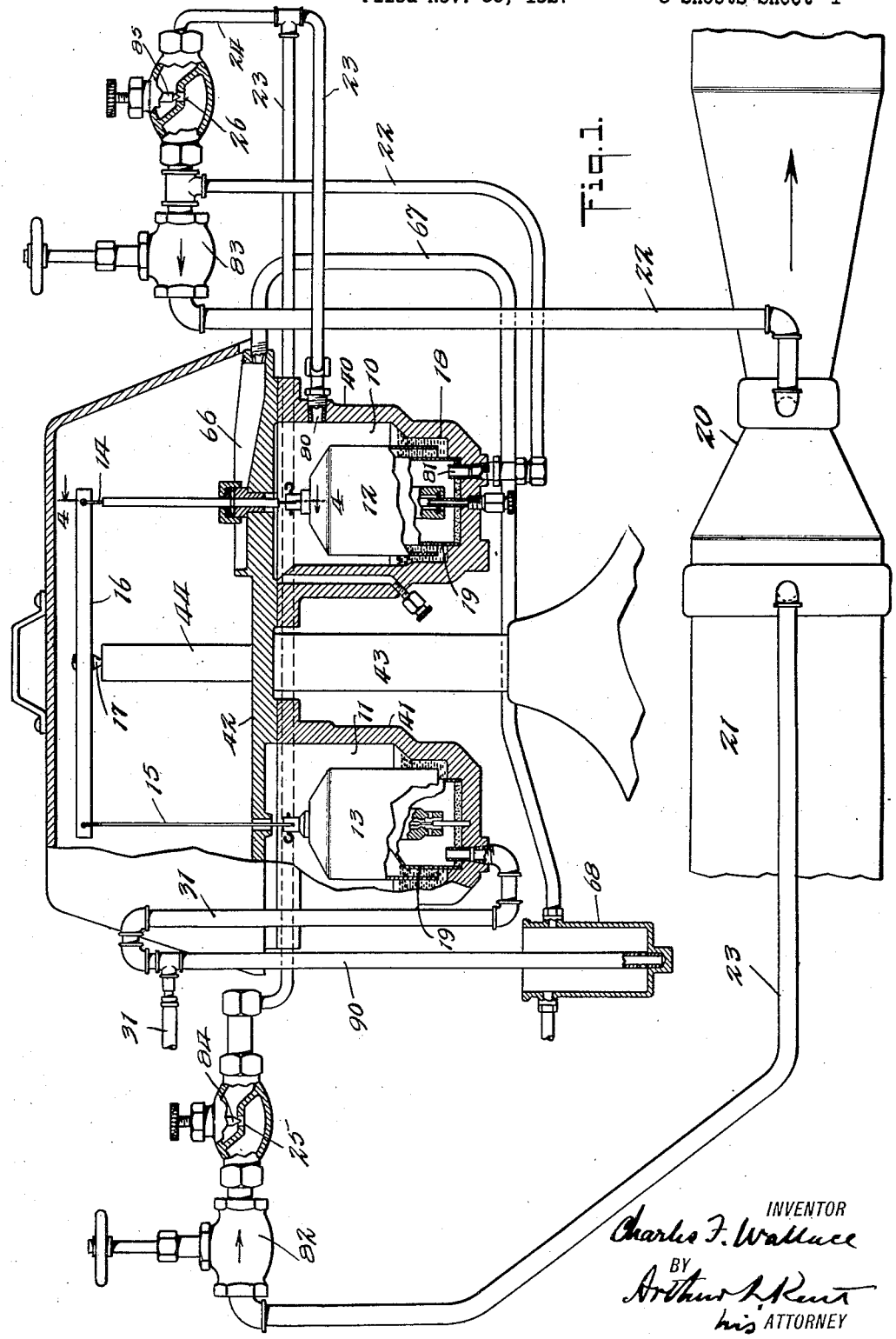

1,762,706

UNITED STATES PATENT OFFICE

CHARLES F. WALLACE, OF WESTFIELD, NEW JERSEY, ASSIGNOR TO WALLACE & TIERNAN COMPANY, INC., OF BELLEVILLE, NEW JERSEY, A CORPORATION OF NEW YORK

APPARATUS FOR PRODUCING A PROPORTIONATELY VARYING NEGATIVE PRESSURE

Application filed November 30, 1927. Serial No. 236,852.

This invention relates to apparatus for producing a proportionately varied negative pressure corresponding to a varying positive pressure, or, in other words, for producing by the action of a varying positive pressure, and more especially a varying differential pressure, a proportionately varying negative pressure, or partial vacuum measured from atmospheric pressure. A complete apparatus embodying all the features of the invention operated to reduce a differential pressure, or pressure difference, varying over a wide range, such as that obtained from a Venturi meter or other flow measuring device, to a proportionately varying but relatively low pressure difference and then to convert this pressure difference into a proportionately varying partial vacuum. The invention has been made especially with the idea of obtaining a partial vacuum or negative pressure, varying with the square of variations in the rate of flow of flowing water for controlling the operation of automatically operating apparatus for supplying chlorine gas to the flowing water at a rate which varies proportionately to variations in the amount of water flowing. The apparatus of the present invention may, however, be used for other purposes where a proportionately varied negative pressure is desired, and features of the invention may be employed independently of other features thereof. The means for proportionately reducing a varying pressure difference may, for example, be used independently of the means for converting a varying pressure difference into a proportionately varying negative pressure, or the means for producing a proportionately varying negative pressure may depend for its control on a varying positive pressure which is not a pressure difference.

In order to give a full understanding of the invention, a description will now be given in connection with diagrammatic showings of illustrative embodiments thereof, and this will be followed by a detailed description of an apparatus of approved form embodying the various features of the invention, which is also illustrated in the accompanying drawings, in which:

Fig. 1 is a view partly in section and partly in elevation of such an approved embodiment of the invention;

Figs. 2 and 3 are enlarged sectional views of the two differential pressure cups or pistons, the chambers in which they are mounted, and associated parts;

Fig. 4 is a further enlarged detail view showing the means provided for connecting the operating cup or piston with the transmitting lever;

Figure 5:
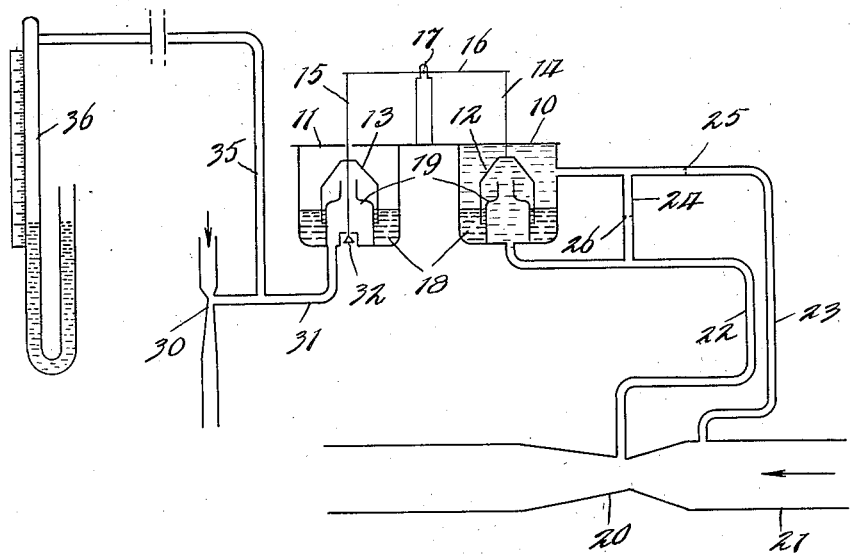
Fig. 5 is a diagrammatic view of an apparatus such as shown in Figs. 1 to 4.

When a varying differential pressure developed by flowing water is employed for operating a member which is movable under a force resulting from the application of the components of the differential pressure to act in opposite directions on the member, the moving force thus acting on the movable member is sometimes greater and varies over a wider range than is desired. When, for example, pipe connections are made to opposite sides of a differential piston or diaphragm from two suitable points of different pressures developed by a Venturi tube connected in a water supply conduit, as from the point of narrowest cross section or critical point and from a point at or adjacent to the beginning or inlet thereof, the difference in pressures acting on opposite sides of the piston may vary over a wide range and represent a force of very considerable magnitude when the velocity of the water is high.

One feature of the present invention consists in means for reducing such an initial varying pressure difference to a proportionately varying but relatively low pressure difference applied to the piston or diaphragm. For this purpose, a by-pass connection is provided between the high pressure pipe and the low pressure pipe leading from the Venturi tube to opposite sides of the differential piston. This by-pass permits a circulation of water through the pipes and by-pass. In order to eliminate the element of friction, a flow restricting orifice is inserted in one of the pipes between the Venturi tube and the by-pass, most desirably in the high pressure pipe in order to reduce the pressures applied to the piston. The by-pass connection between the pipes should be of a size compared to the flow reducing orifice to avoid the introduction of friction in the flow line, and is also provided with a flow restricting orifice of a size to cause the desired differential to be transmitted to the piston. The difference in pressure on the opposite sides of the piston will then be equal to the drop in pressure across the orifice in the by-pass connection, and by making the friction-reducing flow-restricting orifice and the differential-controlling flow-restricting orifice of proper relative sizes, any desired proportionate reduction in the pressure difference transmitted to the piston may be obtained, and in all cases the pressure difference applied to the piston will vary directly in proportion to variations in the pressure difference developed by the water flowing through the Venturi tube, and therefore directly in proportion to the square of variations in the rate of flow of the water.

Another feature of the invention relates to means for converting the reduced varying pressure difference, or, in a broader sense, any varying positive pressure having a suitably limited range of variation, into a proportionately varying partial vacuum or negative pressure. For this purpose, there is provided, in connection with a suction device, means whereby the negative pressure produced by the suction device is controlled by a member which is subjected to the action of atmospheric pressure tending to move it in one direction, and to a force produced by the varying pressure difference, or other varying positive pressure, supplemented by the negative pressure produced by the suction device, tending to move it in the opposite direction, movement of said member causing variation in said negative pressure to equalize the forces acting in opposite directions thereon, whereby the negative pressure, measured from zero pressure, will be varied inversely in proportion to variations in said varying pressure difference or other positive pressure, or directly in proportion thereto if measured from atmospheric pressure.

An apparatus according to the invention is illustrated diagrammatically in Fig. 5. The apparatus comprises two chambers 10 and 11, containing floating diaphragms, or inverted cups, or bells, 12 and 13 connected by links 14 and 15 to a lever 16 outside the chambers fulcrumed at 17. Each chamber contains a body of mercury 18 into which the lower open end of the bell within the chamber extends, thus providing a mercury seal between the outside and the inside of the bell. A circular partition 19 extends upward from the bottom of each chamber within the bell to a point above the normal mercury level.

The chamber 10 is a water-tight chamber, the opening in the top wall of the chamber through which the bell connecting link 14 extends being near as possible water-tight, without friction. The bell 12 is subjected to the action of a reduced pressure difference produced by a Venturi tube 20 interposed in a water supply conduit 21. A low pressure pipe 22 leads from a low pressure point such as the point of minimum cross section of the Venturi tube, and a high pressure line or pipe 23 leads from a point of high pressure at or adjacent to the inlet end of the Venturi tube. The pipe 22 connects into the space beneath the bell, and the pipe 23 connects to the space outside the bell above the mercury level. The pipes are connected by a by-pass connection 24, a flow restricting orifice 25 is provided in the high pressure pipe between the by-pass and the Venturi tube, and a flow restricting orifice 26 is provided in the by-pass pipe 24 for determining the relative pressure difference which will be transmitted to the bell 12. The bell 12 will thus be subjected to an effective pressure or pressure difference which will vary in direct proportion to the pressure difference developed by the Venturi tube and in direct proportion to the square of variations in the velocity or rate of flow of water through the conduit.

The space within the chamber 11 above the mercury is open to the atmosphere so that the bell 13 is subjected on the outside to atmospheric pressure. A suction device, such as the water aspirator 30, is connected by a pipe or tube 31 through an opening in the bottom wall of the casing 11 to the space within the bell 13. The suction of the aspirator tends to produce a negative pressure inside the bell. The degree of partial vacuum, or negative pressure, maintained inside the bell and in the connecting pipe 31 is controlled by means of an air inlet valve 32 which is controlled by the up and down movement of the bell to restrict the inflow of air to the space within the bell when the bell moves upward.

When there is no flow of water through the conduit 21, the pressure on the outside and on the inside of the bell 12 will be equal, and the air inlet valve 32 will be open to supply the aspirator 30 with all the air it can take and to maintain atmospheric pressure inside the bell 13 which will balance the atmospheric pressure on the outside of this bell. When there is a flow through the conduit, a differential pressure is produced by the Venturi tube, and the pressure on the outside of the bell 12 becomes greater than the pressure on the inside thereof, and the bell 12 is thereby caused to move downward. By the downward movement of the bell 12, the bell 13 is raised to partially close the air inlet valve 32, thereby causing a partial vacuum to be developed in the space beneath the bell 13 by the suction of the aspirator. Movement of the bells will cease when the difference in pressures acting on the bell 13 exactly balances the difference in pressures acting on the bell 12, and any variation in the pressure difference acting on the bell 12 resulting from variation in the rate of flow of the water through the conduit will cause a movement of the bell 13 and adjustment of the valve 32 to correspondingly vary the negative pressure beneath the bell 13, decrease in the differential on the bell 12 causing an opening of the valve 32 to decrease the negative pressure, and increase in the differential on the bell 12 causing a closing movement of the valve to increase the negative pressure. The negative pressure maintained beneath the bell 13 and in the suction line 31 will thus be varied proportionately to variations in the pressure difference acting on the bell 12, and, therefore, in proportion to the square of variations in the quantity of water flowing through the conduit.

The varying partial vacuum so produced may be communicated by means of a connecting pipe to the apparatus or device in which it is to be utilized. As stated, the present invention has been made especially with the idea of obtaining a partial vacuum, or negative pressure, varying with the rate of flow of water for controlling the operation of apparatus for supplying chlorine gas to the flowing water at a rate varying proportionately with variations in the amount of water flowing. The invention may, however, be used for various other purposes, and by way of example I have shown in Fig. 5 a vacuum gauge 36 to which the connecting pipe 35 leads. This gauge might be set at a considerable distance away from the Venturi tube and from the differential reducing and converting apparatus, and would serve to indicate at a distant point the rate of flow of water through the conduit.

Figure 6:
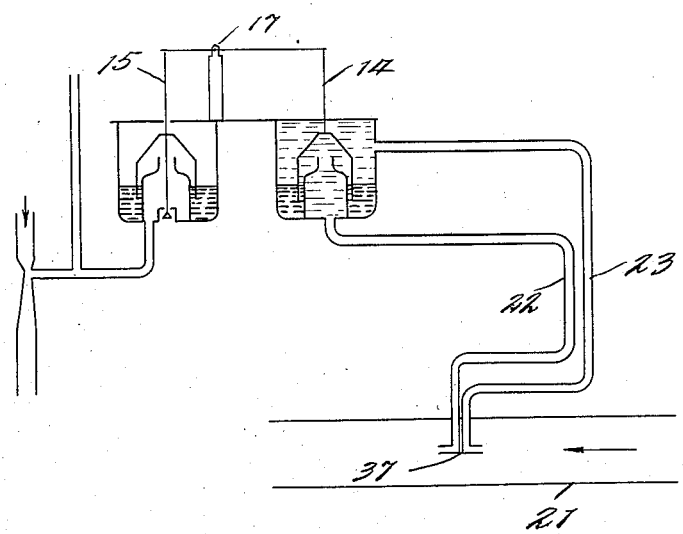
Fig. 6 is a similar view of a modified form of apparatus.

When the initial differential pressure by which the apparatus is controlled is greater than the degree of partial vacuum or negative pressure desired to be produced by the apparatus, and the differential reducing means of the invention is employed for reducing the initial differential pressure to the desired proportionate differential, the bells 12 and 13, or other differential pressure actuated members, may be of the same size, and the lever 16 may be fulcrumed at its center, adjustment of the orifices 25 and 26 being depended upon to produce the desired range and degree of partial vacuum. Obviously, however, the bells may be of different relative size, and the lever may be fulcrumed to have arms of different length, according to the relation desired between the varying pressure difference to which the bell 12 is subjected and the negative pressure desired to be developed beneath the bell 13. If, for example, as shown in Fig. 6, the pressure difference transmitted to the bell 12 is developed by Pitot tubes 37 set in the conduit 21, the pressure difference will be relatively small and there will be no need for reducing it. On the contrary, it will be desirable to have the negative pressures developed beneath the bell 13 of greater magnitude than the positive pressure difference acting on the bell 12. The pressure lines 22 and 23 will, therefore, in this case, be arranged to transmit the full initial pressure difference to the bell 12 and the differential converter will be made to act as a step-up converter, as by having the fulcrum 17 positioned closer to the link 15 than to the link 14.

Referring now to Figs. 1 to 4, these figures show constructional features of an apparatus made according to the invention to be operated by a pressure developed by a Venturi tube as shown diagrammatically in Fig. 5. The diaphragm or bell chambers 10 and 11 are formed by casings 40 and 41, respectively, hung from a supporting plate 42, which is mounted on a standard 43. The beam or lever 16 is fulcrumed on a standard 44 extending upward from the plate 42. The fulcrum 17 should be of the knife-edge or other suitable form. The bells 12 and 13, and the casings 40 and 41, and the inner casings or partitions 19, are, most desirably, circular in cross section, the partitions being formed open at both ends and secured and sealed at their lower ends to the bottoms of the chamber casings. The side walls of the chamber casings and the partitions 19 extend fairly close to the lower portion of the bell so as to provide a comparatively narrow annular space or well for the mercury, and at a suitable distance above the bottom of the bell the chamber walls have an outwardly flaring portion and the partitions 19 have an inwardly inclined portion whereby the rise of the mercury level under the maximum pressure difference within the chambers is reduced. The walls of the bells, and more particularly the vertical walls, should be as thin as possible, and the bells and the chamber casings and the partitions 19 should be made of a metal or other material which will not alloy or react with the mercury.

The bell 12 is steadied and guided by means of a tube 50 which extends downward from the top of the bell and carries a bearing member 51 which slides freely on an inner tube 52 extending upward within the tube 50 from an opening in the bottom of the chamber casing. An air relief valve 53 connected to the bottom of the tube 52 serves for permitting escape of any air which may collect in the upper part of the bell, the space within the upper end of the tube 50 being in communication with the space in the top of the bell by means of ports 54. A port 55 leading from the top of the chamber 10 and controlled by an air relief valve 56 provides for the discharge of any air which may collect in the top of the chamber.

It is desirable that the link 14 by which the bell 12 is connected to the lever 16 shall move freely through the opening in the top wall of the bell chamber, since any resistance to such movement would affect the accuracy of the apparatus. At the same time, provision must be made against the escape of water from the chamber. Frictional resistance, due to corrosion of parts, must also be guarded against. To these ends, the connecting link 14 is formed by a length of fine wire 60 of tungsten or other suitable metal or other material which is non-corrodible in water, and this fine wire is provided with end pieces 61 formed of small tubing into which the ends of the wire 60 extend and are secured, and the end pieces 61 being formed with eyes or otherwise shaped for attachment, one to the head piece of the bell 12 and the other to the lever 16. The wire 60 passes through an opening in a bushing 62 also formed of non-corrodible material and which is fitted within a tube 63 extending through a stuffing box 64 mounted in an opening in the top wall of the chamber 10. The tube 63 is held in place by a flange 65 which is clamped between the body and the packing of the stuffing box, and the tube extends beyond the bushing 62 for the purpose of protecting the fine wire 60. The opening through the bushing 62 is of slightly greater diameter than the wire 60 so that the wire may move through it with complete freedom. There will thus be a slight leakage of water from the chamber 10 through the opening in the bushing, but because of the very small size of the opening and the slight clearance between the wall of the opening and the wire, this leakage will be but slight and not sufficient to appreciably affect the pressure within the chamber. The water passing through the bushing will rise in the tube 63 and fall from the top of the pipe into a tray 66 from which it is drained by a pipe 67 into a water-sealed well 68, hereinafter referred to.

The valve operated by movement of the bell 13 for controlling the degree of negative pressure maintained beneath the bell comprises a fixed member 70 formed by a tapered portion of a valve rod 71 carried by a stud which extends upward from the bottom wall of the chamber casing 41 to which it is secured, and a movable member 72 formed by a block having a through port 73 and shaped to provide an annular seat for the fixed member 70, carried by a tube 74 which extends downward from the top of the bell 13 and communicates through ports 75 with the space within the chamber 11 outside the bell in which external atmospheric pressure is maintained through a port 76. When the bell is in the position shown in Fig. 2, the valve is open and provides a passage for the flow of air through the ports 75, tube 74, and port 73 into the space within the partition 19, which, as the top of the partition is opened, forms part of the space within the bell. The valve rod 71 above the valve member is provided with guide pins 76, which, however, do not bear against the walls of the tube 73 sufficiently to interfere with the free movement of the bell.

The high pressure line 23 leading from the inlet end of the Venturi tube 20 to the inlet opening 80 opening into the chamber 10 above the mercury level, and the low pressure line 22 leading from the Venturi throat to the inlet opening 81 opening into the space in the chamber 10 beneath the bell, are connected by a by-pass connection 24, and a flow restricting orifice 25 is provided in the high pressure line, and a flow controlling orifice for determining the differential transmitted to the bell 12 is provided in the by-pass 24, as in the apparatus shown diagrammatically by Fig. 5. The high pressure line and the low pressure line are each provided with a shut-off valve 82 and 83, respectively. In order to provide means for adjusting the differential transmitted to the bell 12, the orifices 25 and 26 are made adjustable by means of needle valves 84 and 85, respectively.

The operation will be understood from the description already given in connection with Fig. 5.

A pipe 90 extending downward from the suction pipe 31 and open at its lower end to the cup or well 68 below the water level therein, provides a water-sealed drain for draining from the air pipe 31 which extends to the aspirator or other suction device, which may be at some distance from the chamber 11, any water which may be condensed in that pipe. The pipe also serves as a water-column tube for limiting the suction which may be drawn by the aspirator. This pipe 90 is desirably made of glass so that it may serve as an indicating means to show by the water-column therein whether the apparatus is operating properly.

A block 91 on the tube 50 serves to weight the bell 12 to balance the weight of the valve block 72 on the bell 13.

What is claimed is:

1. Fluid pressure transmission apparatus for transmitting and proportionately reducing a varying differential pressure, comprising a high pressure pipe, a low pressure pipe, a friction-reducing flow-restricting orifice in one of said pipes, a by-pass connecting said pipes located beyond said flow-restricting orifice, and a differential-controlling flow-restricting orifice in said by-pass.

2. Fluid pressure transmission apparatus for transmitting and proportionately reducing a varying differential pressure, comprising a high pressure pipe, a low pressure pipe, a friction-reducing flow-restricting orifice in the high pressure pipe, a by-pass connecting said pipes located beyond said flow-restricting orifice, and a differential-controlling flow-restricting orifice in said by-pass.

3. Fluid pressure transmission apparatus for transmitting and proportionately reducing a varying differential pressure, comprising a high pressure pipe, a low pressure pipe, an adjustable friction-reducing flow-restricting orifice in one of said pipes, a by-pass connecting said pipes located beyond said orifice, and an adjustable differential-controlling flow-restricting orifice in said by-pass.

4. The combination with means for developing a varying pressure difference, of a differential-pressure-actuated device, and means for transmitting the pressures produced by the first said means to said device, comprising a high pressure pipe, a low pressure pipe, a friction-reducing flow-restricting orifice in the high pressure pipe, a by-pass connecting said pipes located beyond said flow-restricting orifice and a differential-controlling flow restricting orifice in said by-pass.

5. The combination with a pressure responsive movable member, and means for applying relatively varying fluid pressures to opposite sides of said member, of a second pressure responsive member connected to be moved by the first member, means for maintaining a constant pressure against one side of the second member, a chamber on the other side of the second member having a suction outlet, a suction device connected to said outlet, and means controlled by movement of said second member for varying the partial vacuum maintained in said chamber to equalize the forces tending to move the second member, whereby the negative pressure maintained in said chamber will be varied proportionately to the difference in pressures applied to the first member.

6. The combination with a pressure responsive movable member, and means for applying relatively varying fluid pressures to opposite sides of said member, of a second pressure responsive member connected to be moved by the first member, one side of the second member being exposed to atmospheric pressure, a chamber on the other side of the second member having a suction outlet, a suction device connected to said outlet, and means controlled by movement of said second member for varying the partial vacuum maintained in said chamber to equalize the forces tending to move the second member, whereby the negative pressure maintained in said chamber will be varied proportionately to the difference in pressures applied to the first member.

7. The combination with a pressure responsive movable member, and means for applying relatively varying fluid pressures to opposite sides of said member, of a second pressure responsive member connected to be moved by the first member, one side of the second member being exposed to atmospheric pressure, a chamber on the other side of the second member having an air inlet and a suction outlet, a suction device connected to said suction outlet, and a valve controlling said air inlet connected to be operated by movement of the second member to close the air inlet as the member moves in the direction that atmospheric pressure tends to move it and to open the air inlet as the member moves in the opposite direction, whereby the negative pressure maintained in said chamber will be varied proportionately with variations in the difference in pressures applied to the first member, and means for transmitting said negative pressure to a utilizing means.

8. The combination of a movable member tending to move in one direction under a constant force, means providing a varying force less than said constant force tending to move said member in the opposite direction, a chamber for containing a body of gas which by acting on a movable surface tends to move said member in the same direction as said varying force, and means controlled according to the movement of said member for varying the gas pressure in said chamber to equalize the forces tending to move said member in opposite directions, whereby the gas pressure in said chamber is varied proportionately to said variations in said varying force.

9. The combination of a member which tends to move under a difference in pressure between atmospheric pressure acting on one side of the member and a sub-atmospheric gas pressure acting on the other side of the member, means for applying to the member a varying force less than the force exerted by atmospheric pressure thereon tending to move the member in the direction opposite to that in which the atmospheric pressure tends to move it, and means controlled by the movement of said member for varying said sub-atmospheric gas pressure to equalize the forces tending to move the member in opposite directions, whereby said sub-atmospheric gas pressure is varied proportionately to variations in said varying force.

10. The combination of a pressure responsive movable member exposed on one side to atmospheric pressure, a chamber to which the other side of said member is exposed having a suction outlet and an air inlet, means for applying to said member a verying force opposed to and less than the force exerted by atmospheric pressure thereon, a suction device connected to said suction outlet, and a valve controlling said air inlet controlled by movement of said member for varying the negative pressure in said chamber to equalize the forces acting on said member in opposite directions, whereby said negative pressure is varied proportionately to variations in said varying force.

11. Apparatus for producing a partial vacuum varying proportionately to the square of variations in the rate of flow of flowing water, comprising a pressure-responsive movable member one side of which is exposed to atmospheric pressure, a chamber to which the other side of said member is exposed, means for applying suction to said chamber, means for applying to said member a force opposed to and less than the force exerted by atmospheric pressure thereon and varying proportionately to the square of variations in the rate of flow of the water, and means controlled by movement of said member for controlling the degree of partial vacuum maintained in said chamber to equalize the forces tending to move said member in opposite directions.

12. Apparatus for producing a partial vacuum varying with variations in the rate of flow of flowing water, comprising means whereby a pressure difference is developed by the flowing water, means for reducing said pressure difference, a member responsive to variations in said reduced pressure difference, a second pressure-responsive member connected to be moved by the first member, one side of the second member being exposed to atmospheric pressure, means for maintaining a negative gas pressure against the other side of the second member, and means controlled by movement of the second member for varying said negative pressure to equalize the forces tending to move the second member, whereby said negative pressure will be varied proportionately to variations in said pressure difference developed by the flowing water.

13. Apparatus for producing a proportionately varying negative gas pressure, comprising a chamber having a partition extending upward from the bottom of the chamber and dividing the lower portion of the chamber into an inner portion and a surrounding portion and having a sealing liquid in said outer portion and being open to the external atmosphere above said liquid, a vertically movable bell in said chamber with its bottom edge submerged in said liquid, means for applying to the bell a varying force opposed to and less than the force exerted by atmospheric pressure thereon, a suction device connected to the space beneath the bell, and means operated by movement of the bell for controlling the negative pressure beneath the bell to maintain a balance between the forces tending to move the bell.

14. Apparatus for producing a proportionately varying negative gas pressure, comprising a chamber having a partition extending upward from the bottom of the chamber and dividing the lower portion of the chamber into an inner portion and a surrounding portion and having a sealing liquid in said outer portion and being open to the external atmosphere above said liquid, a vertically movable bell in said chamber with its bottom edge submerged in said liquid, means for applying to the bell a varying force opposed to and less than the force exerted by atmospheric pressure thereon, a suction device connected to the space beneath the bell, an air inlet to the space beneath the bell, and a valve controlling said air inlet and connected to be moved by the bell to close the air inlet as the bell moves up and to open the air inlet as the bell moves down, whereby a balance is maintained between the forces tending to move the bell and the negative pressure beneath the bell is varied proportionately to variations in said varying force.

15. Apparatus for producing by a varying differential fluid pressure a proportionately varying negative pressure, comprising a closed chamber, a vertically movable bell suspended in said chamber by a fine wire extending through and freely movable in an opening in the top wall of the chamber and having its lower edge immersed in mercury, means for transmitting a varying differential pressure to said bell, a lever to one end of which said wire is connected, a second vertically movable bell suspended from the other end of said lever with its lower edge immersed in mercury and exposed on the outside to atmospheric pressure, means for applying suction to the space beneath said second bell, means controlled by movement of said second bell for varying the negative pressure beneath the bell to maintain a balance between the moving force exerted on the bell by the effective gas pressure thereon and the moving force transmitted thereto from the first said bell, and means for transmitting said negative pressure.

16. The combination with means providing a closed liquid pressure chamber and a member movable within the chamber under a varying differential pressure, of a transmission rod extending from the movable member through an opening in the chamber wall, said transmission rod comprising a length of fine wire which extends through said opening, and said opening being of a length many times the diameter of the wire and of a size slightly greater than the wire to permit free movement of the wire therethrough and a slight leak of liquid from the chamber.

In testimony whereof I have hereunto set my hand.

CHARLES F. WALLACE.